US012210946B2

(12) United States Patent
Roberts

(10) Patent No.: US 12,210,946 B2
(45) Date of Patent: *Jan. 28, 2025

(54) MACHINE LEARNING BASED FUNCTION TESTING

(71) Applicant: Esurance Insurance Services, Inc., San Francisco, CA (US)

(72) Inventor: Cheryl Roberts, San Francisco, CA (US)

(73) Assignee: Esurance Insurance Services, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,635

(22) Filed: Apr. 10, 2023

(65) Prior Publication Data

US 2023/0244998 A1 Aug. 3, 2023

Related U.S. Application Data

(63) Continuation of application No. 16/235,516, filed on Dec. 28, 2018, now Pat. No. 11,625,641.

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS

| 8,239,335 | B2 | 8/2012 | Schmidtler et al. |
| 8,719,197 | B2 | 5/2014 | Schmidtler et al. |
| 2019/0236478 | A1 | 8/2019 | Wu et al. |
| 2019/0279109 | A1 | 9/2019 | Guelman |
| 2019/0370687 | A1 | 12/2019 | Pezzillo et al. |
| 2020/0034665 | A1 | 1/2020 | Ghanta et al. |
| 2021/0350283 | A1 | 11/2021 | Fujita et al. |

*Primary Examiner* — Daniel T Pellett
(74) *Attorney, Agent, or Firm* — Polsinelli PC

(57) ABSTRACT

A method for determining the performance metric of a function may include interpolating the performance metric of the function relative to a known performance metric of a reference function. The performance metric of the function may be interpolated based on a first difference in a performance of the function measured by applying a first machine learning model and a performance of the function measured by applying a second machine learning model. The performance metric of the function may be further interpolated based on a second difference in a performance of the reference function measured by applying the first machine learning model and a performance of the reference function measured by applying the second machine learning model. The function may be deployed to a production system if the performance metric of the function exceeds a threshold value. Related systems and articles of manufacture, including computer program products, are also provided.

20 Claims, 5 Drawing Sheets

MACHINE LEARNING BASED FUNCTION TESTING

CROSS-REFERENCE TO RELATED APPLICATIONS

The present application is a continuation of and claims priority to U.S. patent application Ser. No. 16/235,516 filed on Dec. 28, 2018, which is incorporated by reference in its entirety herein.

TECHNICAL FIELD

The subject matter described herein relates generally to machine learning and more specifically to a machine learning based technique for testing various functions.

BACKGROUND

A function may be applied to a dataset to perform a task. For example, a filter function may be applied to the dataset in order to determine, based on one or more features associated with each record in the dataset, a class membership for each record in the dataset. That is, the filter function may be configured to differentiate, based on the features associated with each record in the dataset, between records in the dataset that belong to different classes. For instance, the filter function may be configured to identify and/or differentiate between records in a dataset that are associated with a plant class and records in the dataset that are associated with an animal class. By identifying and/or differentiating between records in the dataset that belong to the plant class and records in the dataset that belong to the animal class, the filter function may separate the records in the dataset into the two classes and/or remove, from the dataset, records belonging to one class but not the other class.

SUMMARY

Systems, methods, and articles of manufacture, including computer program products, are provided for machine learning based function testing. In some example embodiments, there is provided a system that includes at least one processor and at least one memory. The at least one memory may include program code that provides operations when executed by the at least one processor. The operations may include: applying, to a first output of a function, a first machine learning model trained to determine a first quantity of mislabeled records in the first output of the function, the function being configured to label each record in a dataset as being a member of a first class or a second class; applying, to the first output of the function, a second machine learning model trained to determine a second quantity of mislabeled records in the first output of the function; determining, based at least on a first difference between the first quantity of mislabeled records and the second quantity of mislabeled records, a performance metric for the function; and deploying, based at least on the performance metric of the function, the function to a production system.

In some variations, one or more features disclosed herein including the following features can optionally be included in any feasible combination. The first machine learning model may be applied to a second output of a first reference function associated with a first known performance metric to determine a third quantity of mislabeled records in the second output of the first reference function. The second machine learning model may be applied to the second output of the first reference function to determine a fourth quantity of mislabeled records in the second output of the first reference function. The performance metric for the function may be determined, based a second difference between the third quantity of mislabeled records and the fourth quantity of mislabeled records, relative to the first known performance metric of the first reference function.

In some variations, the performance metric of the function may be determined to be greater than the first known performance metric of the first reference function based at least on the first difference being greater than the second difference. The performance metric of the function may be determined to be less than the first known performance metric of the first reference function based at least on the first difference being less than the second difference.

In some variations, the first machine learning model may be applied to a third output of a second reference function associated with a second known performance metric to determine a fifth quantity of mislabeled records in the third output of the second reference function. The second machine learning model may be applied to the third output of the second reference function to determine a sixth quantity of mislabeled records in the third output of the second reference function. The performance metric for the function may be determined, based on a third difference between the fifth quantity of mislabeled records and the sixth quantity of mislabeled records, relative to the second known performance metric of the second reference function.

In some variations, the performance metric of the function may be determined to be greater than the first known performance metric of the first reference function but less than the second known performance metric of the second reference function based at least on the first difference being greater than the second difference but less than the third difference.

In some variations, the function may be deployed to the production system based at least on the performance metric of the function exceeding a threshold value.

In some variations, the function may be a deterministic model or a machine learning model.

In some variations, the first machine learning model may be trained to identify mislabeled records based on a first set of features. The second machine learning model may be trained to identify mislabeled records based on a second set of features that include at least one additional feature not present in the first set of features. The first set of features may exhibit at least some correlation to one or more features used by the function to label records in a dataset. The at least one additional feature may be predictive of class membership but exhibits a below threshold correlation to the one or more features used by the function to label the records in the dataset.

In some variations, the first machine learning model and/or the second machine learning model may be trained by at least processing, with the first machine learning model and/or the second machine learning model, training data that includes a first record known to be associated with a correct label and/or a second record known to be associated with an incorrect label. The first machine learning model and/or the second machine learning model may be trained using a supervised learning technique. The training of the first machine learning model and/or the second machine learning model may include backpropagating an error in the identification of mislabeled records and performing gradient descent to at least minimize the error in the identification of mislabeled records.

In some variations, the first machine learning model and/or the second machine learning model may be a predictive machine learning model.

In some variations, the first machine learning model and/or the second machine learning model may be a support vector machine, a Bayes classifier, a neural network, a gradient boosting machine, an elastic net, and/or a decision tree.

In another aspect, there is provided a method for machine learning based function testing. The method may include: applying, to a first output of a function, a first machine learning model trained to determine a first quantity of mislabeled records in the first output of the function, the function being configured to label each record in a dataset as being a member of a first class or a second class; applying, to the first output of the function, a second machine learning model trained to determine a second quantity of mislabeled records in the first output of the function; determining, based at least on a first difference between the first quantity of mislabeled records and the second quantity of mislabeled records, a performance metric for the function; and deploying, based at least on the performance metric of the function, the function to a production system.

In some variations, one or more features disclosed herein including the following features can optionally be included in any feasible combination. The method may further include: applying, to a second output of a first reference function associated with a first known performance metric, the first machine learning model to determine a third quantity of mislabeled records in the second output of the first reference function; applying, to the second output of the first reference function, the second machine learning model to determine a fourth quantity of mislabeled records in the second output of the first reference function; and determining, further based a second difference between the third quantity of mislabeled records and the fourth quantity of mislabeled records, the performance metric for the function relative to the first known performance metric of the first reference function.

In some variations, the performance metric of the function may be determined to be greater than the first known performance metric of the first reference function based at least on the first difference being greater than the second difference. The performance metric of the function may be determined to be less than the first known performance metric of the first reference function based at least on the first difference being less than the second difference.

In some variations, the method may include: applying, to a third output of a second reference function associated with a second known performance metric, the first machine learning model to determine a fifth quantity of mislabeled records in the third output of the second reference function; applying, to the third output of the second reference function, the second machine learning model to determine a sixth quantity of mislabeled records in the third output of the second reference function; and determining, further based on a third difference between the fifth quantity of mislabeled records and the sixth quantity of mislabeled records, the performance metric for the function relative to the second known performance metric of the second reference function.

In some variations, the performance metric of the function may be determined to be greater than the first known performance metric of the first reference function but less than the second known performance metric of the second reference function based at least on the first difference being greater than the second difference but less than the third difference.

In some variations, the function may be deployed to the production system based at least on the performance metric of the function exceeding a threshold value.

In some variations, the function may be a deterministic model or a machine learning model.

In some variations, the first machine learning model may be trained to identify mislabeled records based on a first set of features. The second machine learning model may be trained to identify mislabeled records based on a second set of features that include at least one additional feature not present in the first set of features. The first set of features may exhibit at least some correlation to one or more features used by the function to label records in a dataset. The at least one additional feature may be predictive of class membership but exhibits a below threshold correlation to the one or more features used by the function to label the records in the dataset.

In some variations, the method may further include training the first machine learning model and/or the second machine learning model by at least processing, with the first machine learning model and/or the second machine learning model, training data that includes a first record known to be associated with a correct label and/or a second record known to be associated with an incorrect label. The first machine learning model and/or the second machine learning model may be trained using a supervised learning technique. The training of the first machine learning model and/or the second machine learning model may include backpropagating an error in the identification of mislabeled records and performing gradient descent to at least minimize the error in the identification of mislabeled records.

In some variations, the first machine learning model and/or the second machine learning model may be a predictive machine learning model.

In some variations, the first machine learning model and/or the second machine learning model may be a support vector machine, a Bayes classifier, a neural network, a gradient boosting machine, an elastic net, and/or a decision tree.

In another aspect, there is provided a computer program product that includes a non-transitory computer readable medium storing instruction. The instructions may cause operations when executed by at least one data processor. The operations may include: applying, to a first output of a function, a first machine learning model trained to determine a first quantity of mislabeled records in the first output of the function, the function being configured to label each record in a dataset as being a member of a first class or a second class; applying, to the first output of the function, a second machine learning model trained to determine a second quantity of mislabeled records in the first output of the function; determining, based at least on a first difference between the first quantity of mislabeled records and the second quantity of mislabeled records, a performance metric for the function; and deploying, based at least on the performance metric of the function, the function to a production system.

In some variations, there is provided an apparatus for machine learning based function testing. The apparatus may include: means for applying, to a first output of a function, a first machine learning model trained to determine a first quantity of mislabeled records in the first output of the function, the function being configured to label each record in a dataset as being a member of a first class or a second class; means for applying, to the first output of the function, a second machine learning model trained to determine a second quantity of mislabeled records in the first output of the function; means for determining, based at least on a first difference between the first quantity of mislabeled records and the second quantity of mislabeled records, a performance metric for the function; and means for deploying, based at least on the performance metric of the function, the function to a production system.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, a connection over a network (e.g. the Internet, a wireless wide area network, a local area network, a wide area network, a wired network, or the like), a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to machine learning based function testing, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
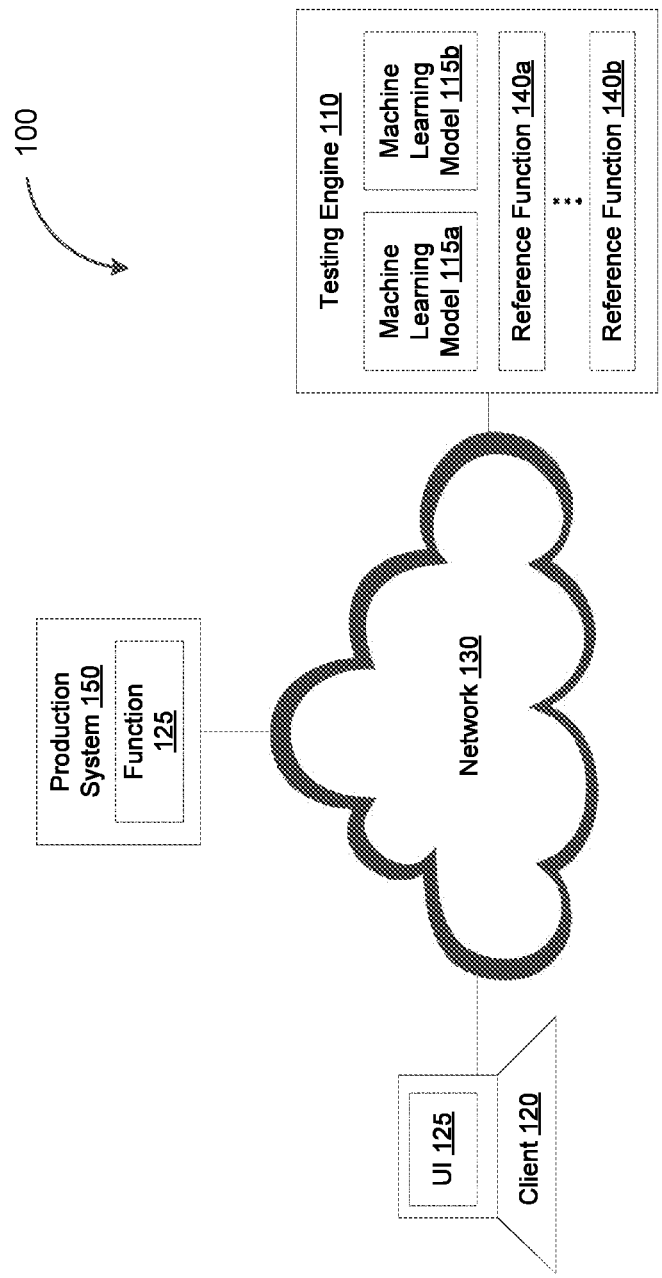
FIG. 1 depicts a system diagram illustrating a function testing system, in accordance with some example embodiments.

While a function may be applied to a dataset to perform a task, the performance of the function in performing the task may be indeterminate. For example, a filter function may yield false positives and/or false negatives by incorrectly labeling one or more records in the dataset as being members of a class. In doing so, the filter function may generate a defective output that includes a dirty population of incorrectly labeled records. For instance, the dirty population of incorrectly labeled records may include records that belong to one class but are labeled as belonging to a different class. As such, the presence of false positives and/or false negatives, especially in excessive quantities, may render the function unsuitable for performing its intended task and/or incapable of achieving a desired outcome.

In some example embodiments, a testing engine may be configured to determine the performance of a function including, for example, a classifier function, a filter function, and/or the like. It should be appreciated that the function may be a machine learning model that has been trained to perform a variety of cognitive tasks such as, for example, regression tasks, classification tasks, and/or the like, that may result in a dataset being filtered and/or classified into one or more groups of records based on the class membership of each record within the dataset. For instance, the function may be a deep learning model including, for example, a neural network, a belief network, a restricted Boltzmann machine, and/or the like. Alternatively and/or additionally, the function may be a deterministic model that applies one or more rules in order to filter and/or classify the records in a dataset into groups of records in accordance with the class membership of each record within the dataset.

In some example embodiments, the testing engine may assess the performance of a function by at least applying one or more machine learning models to an output of the function and an output of a reference function having a known performance metric. The testing engine may determine a performance metric for the function based at least on an interpolation of the known performance metric of the reference function. For example, the function may be a filter function configured to label, based on one or more features associated with each record in the dataset, each record in the dataset as being a member of one of a plurality of classes. However, the output of the function may include a dirty population of incorrectly labeled records. As such, the one or more machine learning models may be applied to the output of the function in order to determine a quantity of mislabeled records in the output of the function. The same machine learning models may also be applied to the output of the reference function to determine a quantity of mislabeled records in the output of the reference function. A metric score for the function may be interpolated based at least on a difference in the quantity of the quantity of mislabeled records present in the output of the function and in the output of the reference function.

In some example embodiments, the one or more machine learning models may include a first machine learning model that is trained to identify mislabeled records based on a first set of features. The one or more machine learning models may further include a second machine learning model that is trained to identify mislabeled records based on a second set of features. The first set of features may include features exhibiting at least some correlation to the features used by the function. Meanwhile, the second set of features may include the first set of features as well as at least one additional feature that is predictive of class membership but exhibits a below threshold (e.g., statistically insignificant) correlation to the features used by the function. Accordingly, the second machine learning model may be capable of identifying a greater quantity of mislabeled records in the output of the function than the first machine learning model. Moreover, the testing engine may determine that the function is capable of correctly labeling the records in a dataset if the second machine learning model is capable of identifying a greater quantity of mislabeled records in the output of the function than in the output of the reference function.

In some example embodiments, the first machine learning model and/or the second machine learning model may be a predictive machine learning model trained to learn the distinguishing features of different classes of records. Examples of a predictive machine learning model may include a support vector machine, a Bayes classifier, a neural network, a gradient boosting machine, an elastic net, a decision tree, and/or the like. Moreover, the first machine learning model and/or the second machine learning model may be trained using a supervised learning technique to differentiate between correctly labeled records and incorrectly labeled records. For example, the first machine learning model and/or the second machine learning model may be trained using training data that includes records that are known to be associated with a correct label and/or records that are known to be associated with an incorrect label. During supervised training, the first machine learning model and/or the second machine learning model may process the training data to provide an output identifying the correctly labeled records and/or the incorrectly labeled records. Moreover, the error that is present in the output of the first machine learning model and/or the second machine learning model may be back propagated and minimized using an optimization technique such as, for example, gradient descent and/or the like.

FIG. 1 depicts a system diagram illustrating a function testing system 100, in accordance with some example embodiments. Referring to FIG. 1, the function testing system 100 may include a testing engine 110, a client 120, and a production system 150. As shown in FIG. 1, the testing engine 110, the client 120, and/or the production system 150 may be communicatively coupled via a network 130. The client 120 may be any processor-based device including, for example, a smartphone, a tablet computer, a wearable apparatus, a desktop computer, a laptop computer, a workstation, and/or the like. Meanwhile, the network 130 may be any wired and/or wireless network including, for example, a public land mobile network (PLMN), a local area network (LAN), a virtual local area network (VLAN), a wide area network (WAN), the Internet, and/or the like.

In some example embodiments, the client 120 may interact with the testing engine 110 in order to assess the performance of a function 155 before the function 155 is deployed to the production system 150, which provides infrastructure for executing the function 155. For example, the testing engine 110 may determine, in response to a request from the client 120, the performance of the function 155 in performing a task by at least determining a performance metric for the function 155. For instance, the function 155 may be a filter function that may be applied to a dataset to determine, based on one or more features associated with each record in the dataset, a class membership for each record in the dataset. The function 155 may be a machine learning model that has been trained, for example, to filter and/or classify the records in the dataset into one or more groups of records based on the class membership of each record within the dataset. Alternatively and/or additionally, the function 155 may be a deterministic model that applies one or more rules in order to filter and/or classify the records in the dataset into groups of records in accordance with the class membership of each record within the dataset.

For example, the function 155 may be applied to a dataset in order to determine, for each record in a dataset, whether the record is associated with a plant class or an animal class. Accordingly, applying the function 155 to the dataset may generate an output that includes a first group of records labeled as being members of the plant class and a second group of records labeled as being members of the animal class. However, the performance of the function 155 in determining class membership for each member of the dataset may be indeterminate. In particular, the output of the function 155 may include a dirty population of incorrectly labeled records. For instance, the dirty population may include records associated with the plant class but are incorrectly labeled as members of the animal class by the function 155. Alternatively and/or additionally, the dirty population may include records associated with the animal class but are incorrectly labeled as members of the plant class by the function 155.

According to some example embodiments, the testing engine 110 may apply, to the output of the function 155, one or more machine learning models in order to assess the performance of the function 155. For example, the testing engine 110 may apply, to the output of the function 155, a first machine learning model 115a and a second machine learning model 115b. The first machine learning model 115a and/or the second machine learning model 115b may be a predictive machine learning model including, for example, a support vector machine, a Bayes classifier, a neural network, a gradient boosting machine, an elastic net, a decision tree, and/or the like. Furthermore, the first machine learning model 115a and the second machine learning model 115b may each be trained to learn the distinguishing features of records associated with the plant class and records associated with the animal class. In doing so, the first machine learning model 115a and the second machine learning model 115b may each be trained to identify and/or determine a quantity of mislabeled records present in the output of the function 155.

For example, the first machine learning model 115a and the second machine learning model 115b may each be trained to identify records associated with the plant class that are correctly labeled as members of the plant class and/or incorrectly labeled as members of the animal class by the function 155. Alternatively and/or additionally, the first machine learning model 115a and the second machine learning model 115b may each be trained to identify records associated with the animal class that are correctly labeled as being members of the animal class and/or are incorrectly labeled as members of the plant class by the function 155.

In some example embodiments, the first machine learning model 115a may be trained to identify mislabeled records based on a first set of features exhibiting at least some correlation to the features used by the function 155 to determine class membership. Meanwhile, the second machine learning model 115b may be trained to identify mislabeled records based on a second set of features, which may include the first set of features as well as at least one additional feature that is predictive of class membership but exhibits a below threshold (e.g., statistically insignificant) correlation to the features used by the function 155 to determine class membership. For example, the first machine learning model 115a may use a first set of features that includes the feature "thrives in soil," which exhibits at least some correlation to the features used by the function 155 to determine whether a record belongs to the plant class or the animal class. Meanwhile, the second machine learning model 115b may use a second set of features that includes the feature "thrives in soil" as well as the additional feature "feeds on sunlight," which may be predictive of class membership but exhibits a below threshold correlation (e.g., statistically insignificant) to the features used by the function 155.

As used herein, the correlation between two features may refer to a statistic association between the two features. For example, the correlation between two features may correspond to how close the two features are to having a linear relationship such as, for example, a direct linear relationship or an inverse linear relationship. The correlation between two features may be measured using a correlation coefficient such as, for example, Pearson's correlation coefficient and/or the like. As Equation (1) below illustrates, the Pearson's correlation coefficient $P_{x,y}$ for two features X and Y may be a quotient of a covariance of the two features X and Y divided by a product of their respective standard deviations $\sigma_x$ and $\sigma_y$.

a.

$$Px, y = \frac{cov(x, y)}{\sigma x \sigma y} = \frac{E[(x - \mu x(Y - \mu x)]}{\sigma x \sigma y} \quad (1)$$

wherein E may denote an expected value operation, cov(X, Y) may denote a covariance between the feature X and the feature Y, µx may denote an expected value of the feature X, $\mu_Y$ may denote an expected value of the feature Y, $\sigma_x$ may denote a standard deviation associated with the feature X, and $\sigma_y$ may denote a standard deviation associated with the feature Y. It should be appreciated that a Pearson's correlation coefficient of 1 may indicate a perfect direct linear relationship between the features X and Y while a Pearson's correlation coefficient of −1 may indicate a perfect inverse linear relationship between the features X and Y.

a. In some example embodiments, to determine the performance of the function 155, the testing engine 110 may further apply the first machine learning model 115a and the second machine learning model 115b to the output of one or more reference functions including, for example, a first reference function 140a, a second reference function 140b, and/or the like. For example, the first reference function 140a or the second reference function 140b may be configured to randomly label the records in the dataset as belonging to a plant class or an animal class. Moreover, the first reference function 140a and the second reference function 140b may each be associated with a known performance metric. Accordingly, the testing engine 110 may determine a performance metric p for the function 155 based at least on an interpolation of a first performance metric $p_{R1}$ for the first reference function 140a and/or a second performance metric $p_{R2}$ for the second reference function 140b.

b. Because the second machine learning model 115b uses at least one additional feature than the first machine learning model 115a, the second machine learning model 115b may perform better than the first machine learning model 115a when identifying mislabeled records in the output of the function 155, the first reference function 140a, and/or the second reference function 140b. That is, the second machine learning model 115b may be capable of identifying a larger quantity of mislabeled records in the output of the function 155, the first reference function 140a, and/or the second reference function 140b than the first machine learning model 115a. Equations (2)-(4) below illustrate the relationship between the relative performances of the first machine learning model 115a and the second machine learning model 115b in identifying mislabeled records in the output of the function 155, the first reference function 140a, and/or the second reference function 140b.

a. $M2 > M1$ \hfill (2)

b. $M2_{R1} > M1_{R1}$ \hfill (3)

c. $M2_{R2} > M1_{R2}$ \hfill (4)

wherein M1 may denote the quantity of mislabeled records identified by applying the first machine learning model 115a to the output of the function 155, M2 may denote the quantity of mislabeled records identified by applying the second machine learning model 115b to the output of the function 155, $M1_{R1}$ may denote the quantity of mislabeled records identified by applying the first machine learning model 115a to the output of the first reference function 140a, $M2_{R1}$ may denote the quantity of mislabeled records identified by applying the second machine learning model 115b to the output of the first reference function 140a, $M1_{R2}$ may denote the quantity of mislabeled records identified by applying the first machine learning model 115a to the output of the second reference function 140b, and $M2_{R2}$ may denote the quantity of mislabeled records identified by applying the second machine learning model 115b to the output of the second reference function 140b.

The difference between M1 and M2 may be greater when the function 155 is capable of correctly labeling a larger quantity of the records in the dataset. Moreover, if the function 155 is capable of correctly labeling a larger quantity of records in the dataset than the first reference function 140a, then the difference between M1 and M2 should also be greater than the difference between $M1_{R1}$ and $M2_{R1}$. Equation (5) below illustrates the scenario in which the function 155 is capable of correctly labeling a larger quantity of records in the dataset than the first reference function 140a.

$$M2 - M1 > M2_{R1} - M1_{R1} \quad (5)$$

By contrast, if the function 155 is capable of correctly labeling a smaller quantity of records in the dataset than the second reference function 140b, then the difference between M1 and M2 should be less than the difference between $M1_{R2}$ and $M2_{R2}$. Equation (6) below further illustrate the scenario in which function 155 is capable of correctly labeling a smaller quantity of records in the dataset than the second reference function 140b.

$$M2 - M1 < M2_{R2} M1_{R2} \quad (6)$$

According to some example embodiments, the testing engine 110 may determine the performance metric p of the function 155 based on the magnitude of the differences between M1 and M2, $M1_{R1}$ and $M2_{R1}$, and $M1_{R2}$ and $M2_{R2}$. For example, in accordance with Equations (5) and (6), the testing engine 110 may interpolate the performance metric p of the function 155 to be greater than the first performance metric $\rho_{R1}$ for the first reference function 140a but less than the second performance metric $\rho_{R2}$ of the second reference function 140b.

In some example embodiments, the deployment of the function 155, for example, at the production system 150, may depend on the performance metric ρ of the function 155 determined by the testing engine 110. The testing engine 110 may prevent the deployment of the function 155 if the performance metric ρ of the function 155 fails to exceed a threshold value such as, for example, the performance metric of a function configured to assign random labels to the records in a dataset. Alternatively and/or additionally, the testing engine 110 may trigger the deployment of the function 155 to the production system 150 if the performance metric ρ of the function 155 exceeds the threshold value. For example, the testing engine 110 may prevent and/or trigger the deployment of the function 155 by at least generating and/or updating a user interface 125 at the client 120 to display the performance metric ρ of the function 155 and/or a status of deploying the function 155.

Figure 2:
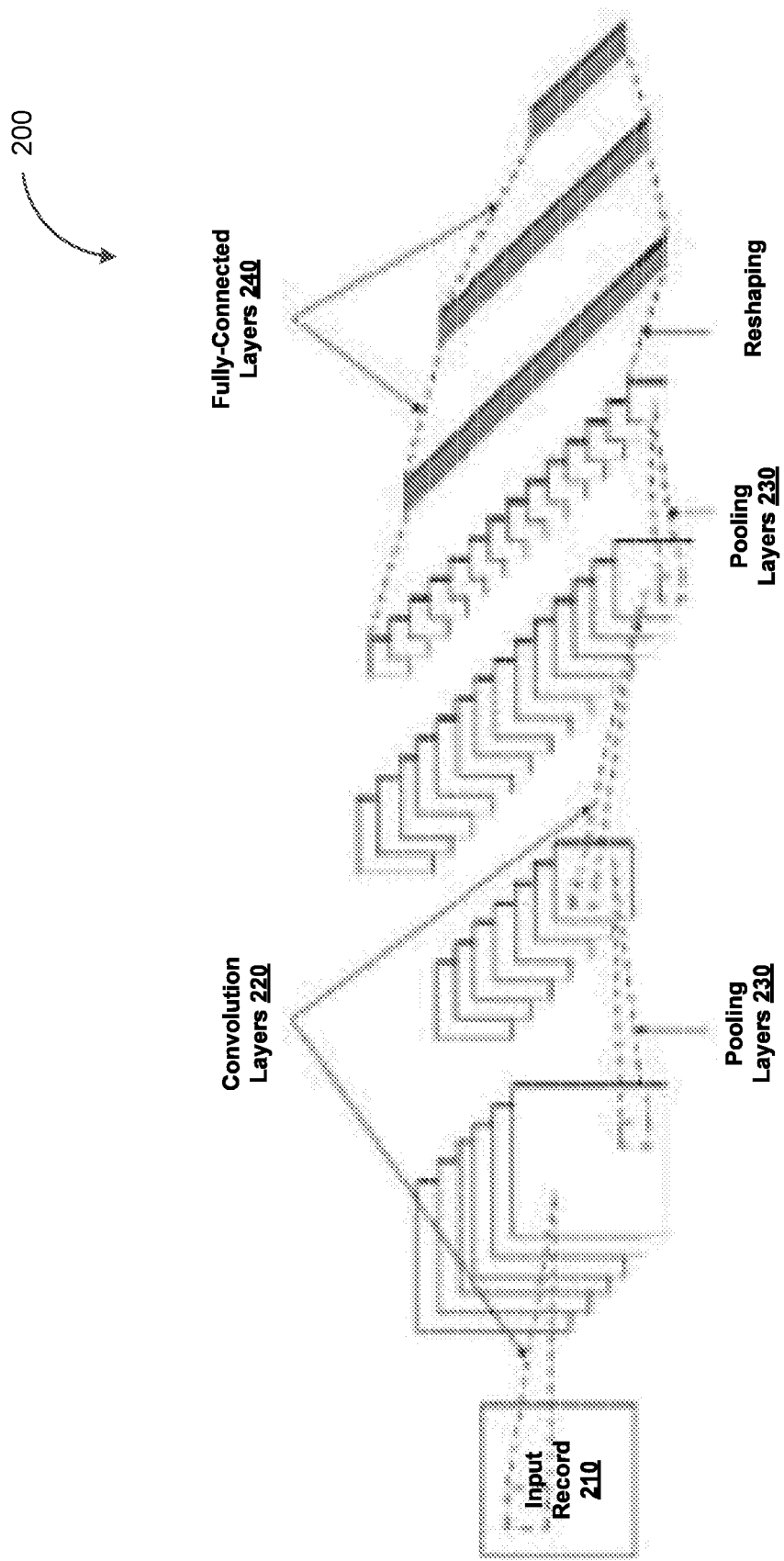
FIG. 2 depicts a schematic diagram illustrating a machine learning model, in accordance with some example embodiments.

FIG. 2 depicts a schematic diagram illustrating a machine learning model 200, in accordance with some example embodiments. Referring to FIGS. 1-2, the machine learning model 200 may implement the first machine learning model 115a and/or the second machine learning model 115b at the testing engine 110. As shown in FIG. 2, the machine learning model 200 may be a neural network, which may be an example of a predictive learning model trained to learn the distinguishing features of different classes of records such as, for example, records from the plant class, records from the animal class, and/or the like. Accordingly, the machine learning model 200 may be capable of determining whether an input record 210 is correctly labeled as being a member of the plant class or a member of the animal class, for example, by the function 155, the first reference function 140a, and/or the second reference function 140b.

In some example embodiments, the machine learning model 200 may include a plurality of layers including, for example, core computation layers, normalization layers, pooling layers, non-linear layers, and/or the like. To further illustrate, FIG. 2 shows the machine learning model 200 as having, for example, one or more convolution layers 220, pooling layers 230, and fully-connected layers 240. Examples of layers that may be present in a machine learning model such as, for example, the machine learning model 200.

Core computation layers can include a fully-connected layer or a 2D convolution layer. Normalization layers can include a L2 normalization layer and/or a batch normalization layer. Pooling layers can include a 2D max pooling layer and/or a 2D mean pooling layer. Non-linear layers can include a softmax layer, a sigmoid layer, a tangent hyperbolic layer, and/or a rectified linear unit layer.

Figure 3:
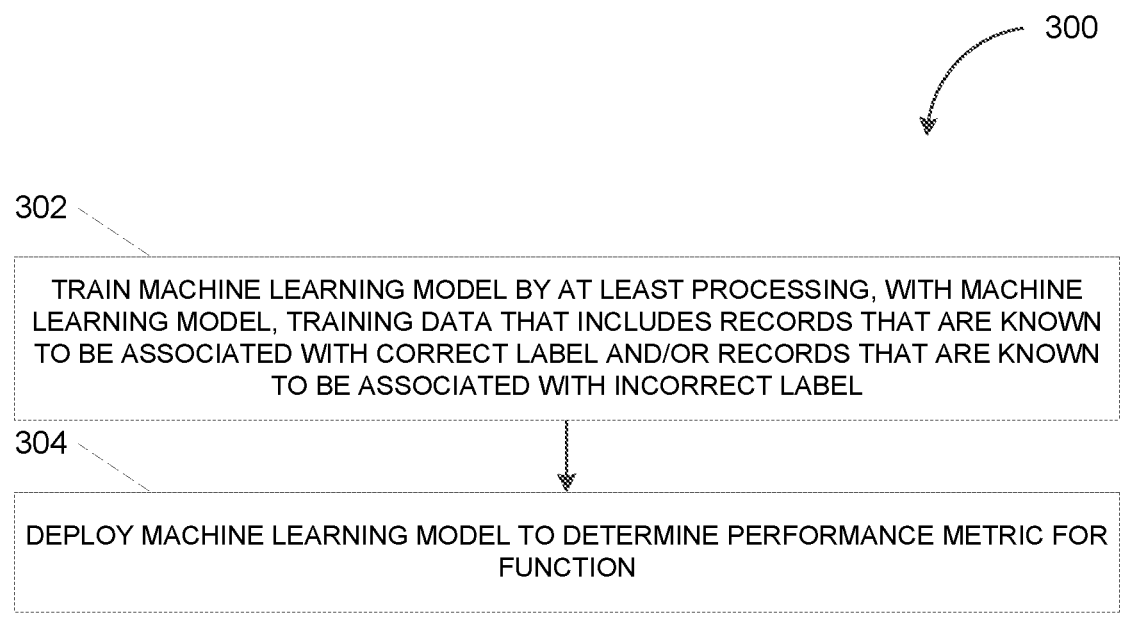
FIG. 3 depicts a flowchart illustrating a process for training a machine learning model, in accordance with some example embodiments.

FIG. 3 depicts a flowchart illustrating a process 300 for training a machine learning model, in accordance with some example embodiments. Referring to FIGS. 1-3, the process 300 may be performed by the testing engine 110 in order to train, for example, the first machine learning model 115a and/or the second machine learning model 115b to determine a quantity of mislabeled records in an output of the function 155, the first reference function 140a, and/or the second reference function 140b.

At 302, the testing engine 110 may train a machine learning model by at least processing, with the machine learning model, training data that includes records that are known to be associated with a correct label and/or records that are known to be associated with an incorrect label. In some example embodiments, the testing engine 110 may train the first machine learning model 115a and/or the second machine learning model 115b using training data that includes records that are known to be associated with a correct label and/or records that are known to be associated with an incorrect label. For example, the training data may include records associated with the animal class that are correctly labeled as members of the animal class as well as records associated with the animal class that are incorrectly labeled as members of the plant class. Alternatively and/or additionally, the training data may include records associated with the plant class that are correctly labeled as members of the plant class as well as records associated with the plant class that are incorrectly labeled as members of the animal class.

At 304, the testing engine 110 may deploy the machine learning model to determine a performance metric for the function. For example, the first machine learning model 115a and/or the second machine learning model 115b may be deployed to determine the performance metric p for the function 155. As noted, whether the function 155 is deployed to the production system 150 may depend on the performance metric p for the function 155. For instance, the function 155 may be deployed to the production system 150 if the performance metric ρ of the function 155 exceeds a threshold value such as, for example, the performance metric of a function configured to assign random labels to the records in a dataset.

Figure 4:
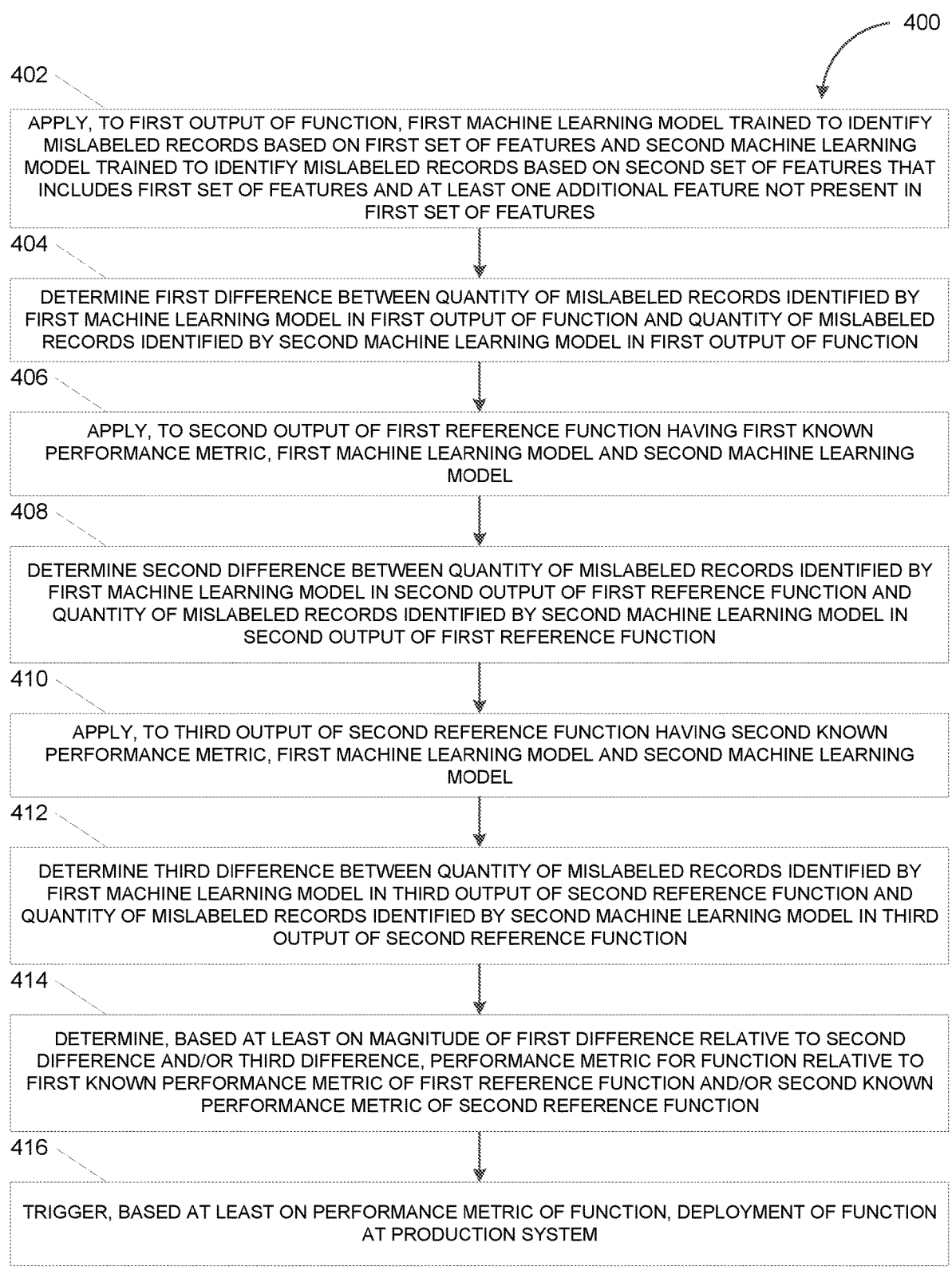
FIG. 4 depicts a flowchart illustrating a process for determining a performance metric for a function, in accordance with some example embodiments.

FIG. 4 depicts a flowchart illustrating a process 400 for determining a performance metric for a function, in accordance with some example embodiments. Referring to FIGS. 1-4, the process 400 may be performed by the testing engine 110 in order to determine the performance metric ρ for the function 155, for example, before the function 155 is deployed to the production system 150 to perform a task such as, for example, determining a class membership for each record in a dataset.

At 402, the testing engine 110 may apply, to a first output of a function, a first machine learning model trained to identify mislabeled records based on a first set of features and a second machine learning model trained to identify mislabeled records based on a second set of features that includes the first set of features and at least one additional feature not present in the first set of features. For example, the testing engine 110 may apply, to the output of the function 155, the first machine learning model 115a and the second machine learning model 115b. In some example embodiments, the first machine learning model 115a may be trained to identify mislabeled records in the output of the function 155 based on a first set of features while the second machine learning model 115b may be trained to identify mislabeled records in the output of the function 155 based on a second set of features. The first set of features may include features exhibiting at least some correlation to the features used by the function whereas the second set of features may include the first set of features as well as at least one additional feature that is predictive of class membership but exhibits a below threshold (e.g., statistically insignificant) correlation to the features used by the function. As noted, the correlation between two features may correspond to how close the two features are to having a linear relationship such as, for example, a direct linear relationship or an inverse linear relationship. For instance, the correlation between two features may be measured using a correlation coefficient such as, for example, Pearson's correlation coefficient and/or the like.

At 404, the testing engine 110 may determine a first difference between a quantity of mislabeled records identified by the first machine learning model in the first output of the function and a quantity of mislabeled records identified by the second machine learning model in the first output of the function. For example, the testing engine 110 may determine the difference between the quantity of mislabeled records identified by applying the first machine learning model 115a to the output of the function 155 and the quantity of mislabeled records identified by applying the second machine learning model 115b to the output of the function 155 (e.g., M2−M1).

At 406, the testing engine 110 may apply, to a second output of a first reference function having a first known performance metric, the first machine learning model and the second machine learning model. For example, the testing engine 110 may apply, to the output of the first reference function 140a having the first performance metric $\rho_{R1}$, the first machine learning model 115a and the second machine learning model 115b.

At 408, the testing engine 110 may determine a second difference between a quantity of mislabeled records identified by the first machine learning model in the second output of the first reference function and a quantity of mislabeled records identified by the second machine learning model in the second output of the first reference function. For example, the testing engine 110 may determine the difference between the quantity of mislabeled records identified by applying the first machine learning model 115a to the output of the first reference function 140a and the quantity of mislabeled records identified by applying the second machine learning model 115b to the output of the first reference function 140a (e.g., $M2_{R1} - M^1_{R1}$).

At 410, the testing engine 110 may apply, to a third output of a second reference function having a second known performance metric, the first machine learning model and the second machine learning model. For instance, the testing engine 110 may apply the first machine learning model 115a and the second machine learning model 115b to the output of the second reference function 140b.

At 412, the testing engine 110 may determine a third difference between a quantity of mislabeled records identified by the first machine learning model in the third output of the second reference function and a quantity of mislabeled records identified by the second machine learning model in the third output of the second reference function. For example, the testing engine 110 may determine the difference between the quantity of mislabeled records identified by applying the first machine learning model 115a to the output of the second reference function 140b and the quantity of mislabeled records identified by applying the second machine learning model 115b to the output of the second reference function 140b (e.g., $M2_{R2} - M1_{R2}$).

At 414, the testing engine 110 may determine, based at least on a magnitude of the first difference relative the second difference and/or the third difference, a performance metric for the function relative to the first known performance metric of the first reference function and the second known performance metric of the second reference function. In some example embodiments, the testing engine 110 may determine the performance metric p of the function 155 based on the magnitude of the differences between M1 and M2, $M1_{R1}$ and $M2_{R1}$, and $M1_{R2}$ and $M2_{R2}$.

The difference between M1 and M2 may be greater when the function 155 is capable of correctly labeling a larger quantity of the records in the dataset. Moreover, if the function 155 is capable of correctly labeling a larger quantity of records in the dataset than the first reference function 140a, then the difference between M1 and M2 should also be greater than the difference between $M1_{R1}$ and $M2_{R1}$. Alternatively and/or additionally, if the function 155 is capable of correctly labeling a smaller quantity of records in the dataset than the second reference function 140b, then the difference between M1 and M2 should be less than the difference between $M1_{R2}$ and $M2_{R2}$. Accordingly, based on the magnitude of the differences between M1 and M2, $M1_{R1}$ and $M2_{R1}$, and $M1_{R2}$ and $M2_{R2}$, the testing engine 110 may interpolate the performance metric p of the function 155 relative to the first performance metric $\rho_{R1}$ for the first reference function 140a and/or the second performance metric $\rho_{PR2}$ of the second reference function 140b. For example, if the difference between M1 and M2 is greater than the difference between $M1_{R1}$ and $M2_{R1}$, the testing engine 110 may interpolate the performance metric ρ of the function 155 to be greater than the first performance metric $\rho_{PR1}$ of the first reference function 140a. Meanwhile, if the difference between M1 and M2 is less than the difference between $M1_{R2}$ and $M2_{R2}$, the testing engine 110 may interpolate the performance metric p of the function 155 to be less than the second performance metric $\rho_{R2}$ of the second reference function 140b.

At 416, the testing engine 110 may trigger, based at least on the performance metric of the function, a deployment of the function at a production system. For example, the testing engine 110 may prevent the deployment of the function 155 if the performance metric ρ of the function 155 fails to exceed a threshold value such as, for example, the performance metric of a function configured to assign random labels to the records in a dataset. Alternatively and/or additionally, the testing engine 110 may trigger the deployment of the function 155 to the production system 150 if the performance metric p of the function 155 exceeds the threshold value. As noted, the testing engine 110 may prevent and/or trigger the deployment of the function 155 by at least generating and/or updating the user interface 125 to display, at the client 120, the performance metric ρ of the function 155 and/or a status of deploying the function 155.

Figure 5:
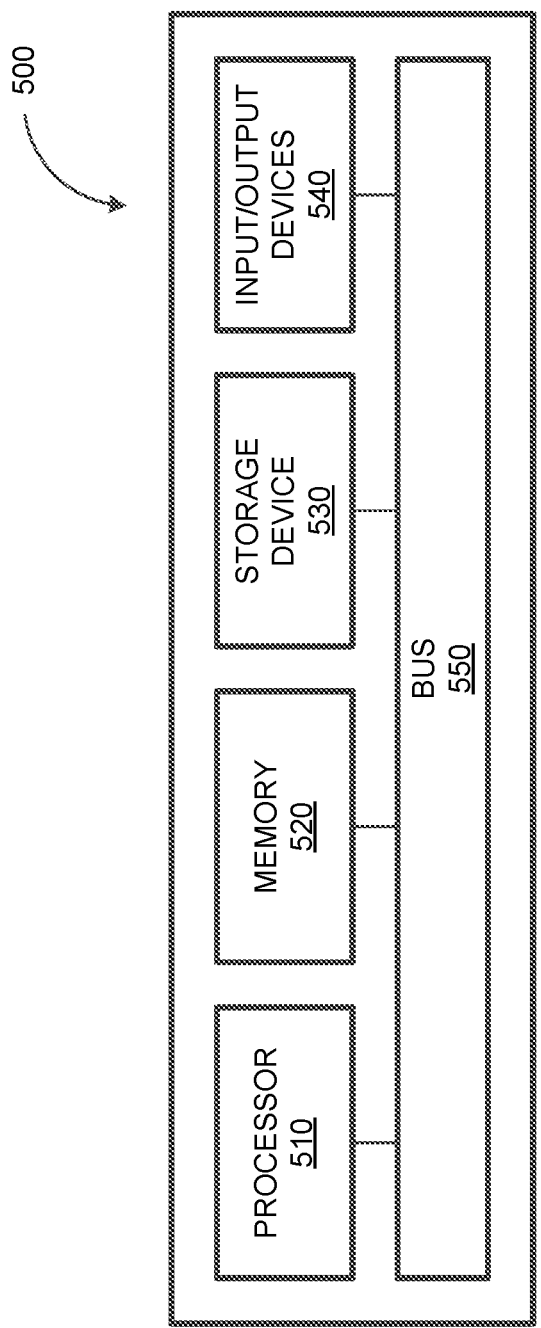
FIG. 5 depicts a block diagram illustrating a computing system, in accordance with some example embodiments.

FIG. 5 depicts a block diagram illustrating a computing system 500, in accordance with some example embodiments. Referring to FIGS. 1-5, the computing system 500 can be used to implement the testing engine 110 and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the testing engine 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

The invention claimed is:

1. A system, comprising:
   at least one processor; and
   at least one memory including program code which when executed by the at least one processor provides operations comprising:
   training a first machine learning model and a second machine learning model by at least processing, with the first machine learning model and the second machine learning model, training data that includes a first record known to be associated with a correct label and a second record known to be associated with an incorrect label;
   determining, based at least on a difference between a first quantity of mislabeled records and a second quantity of mislabeled records, a performance metric for a function, the first quantity of mislabeled records determined by applying the first machine learning model to an output of the function, and the second quantity of mislabeled records determined by applying the second machine learning model to the output of the function; and deploying, based at least on the performance metric of the function, the function to a production system.

2. The system of claim 1, wherein the function is a filter function configured to be applied to a dataset to determine a class membership for each record of a plurality of records in the dataset.

3. The system of claim 2, wherein the filter function is a trained machine learning model.

4. The system of claim 2, wherein the filter function is a deterministic model.

5. The system of claim 2, wherein the plurality of records are associated with one of a plant class or an animal class.

6. The system of claim 1, wherein the first machine learning model and the second machine learning model are a predictive machine learning model including one or more of a support vector machine, a Bayes classifier, a neural network, a gradient boosting machine, an elastic net, or a decision tree.

7. The system of claim 1, wherein the function is deployed to the production system when the performance metric exceeds a threshold value.

8. A method comprising:
receiving, from a client device, a request for a performance metric for a function;
training a first machine learning model and a second machine learning model using training data that includes a first record associated with a correct label and a second record associated with an incorrect label;
determining, based on a difference between a first quantity of mislabeled records and a second quantity of mislabeled records, the performance metric for the function, the first quantity of mislabeled records determined by applying the first machine learning model to an output of the function, and the second quantity of mislabeled records determined by applying the second machine learning model to the output of the function;
generating a command to cause a user interface of the client device to display the performance metric; and
sending the command to the client device.

9. The method of claim 8, wherein the client device is one of a smartphone, a tablet computer, a wearable apparatus, a desktop computer, a laptop computer, or a workstation.

10. The method of claim 8, wherein the function is a filter function configured to be applied to a dataset to determine a class membership for each record of a plurality of records in the dataset.

11. The method of claim 10, wherein the filter function is a trained machine learning model.

12. The method of claim 10, wherein the filter function is a deterministic model.

13. The method of claim 10, wherein the plurality of records are associated with one of a plant class or an animal class.

14. The method of claim 8, wherein the first machine learning model and the second machine learning model are a predictive machine learning model including one or more of a support vector machine, a Bayes classifier, a neural network, a gradient boosting machine, an elastic net, or a decision tree.

15. The method of claim 8, wherein the function is deployed to a production system when the performance metric exceeds a threshold value.

16. A non-transitory computer readable medium storing instructions, which when executed by at least one data processor, result in operations comprising:
training a first machine learning model and a second machine learning model using training data that includes a first record associated with a correct label and a second record associated with an incorrect label;
determining, based on a difference between a first quantity of mislabeled records and a second quantity of mislabeled records, a performance metric for a function, the first quantity of mislabeled records determined by applying the first machine learning model to an output of the function, and the second quantity of mislabeled records determined by applying the second machine learning model to the output of the function;
generating a command to cause a user interface of a client device to display the performance metric; and
deploying, based at least on the performance metric of the function, the function to a production system.

17. The non-transitory computer readable medium storing instructions of claim 16, wherein the client device is one of a smartphone, a tablet computer, a wearable apparatus, a desktop computer, a laptop computer, or a workstation.

18. The non-transitory computer readable medium storing instructions of claim 16, wherein the function is a filter function configured to be applied to a dataset to determine a class membership for each record of a plurality of records in the dataset.

19. The non-transitory computer readable medium storing instructions of claim 18, wherein the filter function is one of a trained machine learning model or a deterministic model.

20. The non-transitory computer readable medium storing instructions of claim 16, wherein the function is deployed to a production system when the performance metric exceeds a threshold value.

* * * * *